United States Patent
Lu et al.

(10) Patent No.: US 7,995,037 B2
(45) Date of Patent: *Aug. 9, 2011

(54) HIDDEN TOUCH PAD STRUCTURE

(75) Inventors: Ying-Ta Lu, Taipei (TW); Wan-Chen Chuang, Taipei (TW)

(73) Assignee: First International Computer, Inc., Taipei (TW)

(*) Notice: Subject to any disclaimer, the term of this patent is extended or adjusted under 35 U.S.C. 154(b) by 1034 days.

This patent is subject to a terminal disclaimer.

(21) Appl. No.: 11/743,221

(22) Filed: May 2, 2007

(65) Prior Publication Data
US 2007/0200834 A1    Aug. 30, 2007

Related U.S. Application Data

(63) Continuation-in-part of application No. 11/624,901, filed on Jan. 19, 2007, now Pat. No. 7,733,334, which is a continuation of application No. 10/792,845, filed on Mar. 5, 2004, now Pat. No. 7,167,163.

(51) Int. Cl.
*G09G 5/00* (2006.01)

(52) U.S. Cl. ........ 345/173; 345/175; 345/176; 345/178; 345/901; 178/18.03; 348/14.03; 463/37; 362/26

(58) Field of Classification Search .......... 345/173, 345/175, 176, 178, 901, 905, 962; 178/18.03, 178/18.08–18.11; 348/14.03; 326/26, 29, 326/600
See application file for complete search history.

(56) References Cited

U.S. PATENT DOCUMENTS

| | | | |
|---|---|---|---|
| 5,736,686 A | 4/1998 | Perret, Jr. et al. | |
| 6,757,002 B1* | 6/2004 | Oross et al. | 715/864 |
| 6,788,295 B1 | 9/2004 | Inkster | |
| 6,933,929 B1* | 8/2005 | Novak | 345/173 |
| 6,956,561 B2 | 10/2005 | Han | |
| 7,167,163 B2 | 1/2007 | Lu | |
| 7,499,040 B2* | 3/2009 | Zadesky et al. | 345/204 |
| 7,633,492 B2* | 12/2009 | Hsu | 345/173 |
| 2003/0227766 A1* | 12/2003 | Hom et al. | 362/23 |

* cited by examiner

*Primary Examiner* — Kevin M Nguyen
(74) *Attorney, Agent, or Firm* — Alan Kamrath; Kamrath & Associates PA

(57) ABSTRACT

A hidden touch pad structure adapted for an electronic product includes a touch pad and a plate covering the touch pad. The plate includes a pad-recognizing portion corresponding to the touch pad. A circuit board is electronically connected to the touch pad for receiving a pressure signal when pressing the pad-recognizing portion of the plate.

17 Claims, 8 Drawing Sheets

HIDDEN TOUCH PAD STRUCTURE

This application is a continuation in part (CIP) of U.S. patent application Ser. No. 11/624,901 filed on Jan. 19, 2007 now U.S. Pat. No. 7,733,334 that is a continuation of U.S. patent application Ser. No. 10/792,845 filed on Mar. 5, 2004, now U.S. Pat. No. 7,167,163, which are incorporated herein by reference in their entirety.

FIELD OF THE INVENTION

The present invention relates to a touch pad and, particularly, relates to a hidden touch pad structure adapted for an electronic product, such as a portable computer, a PDA, a mobile phone, or the like.

RELATED ART IN BACKGROUND

With respect to FIG. 1 and FIG. 1A, a conventional laptop 1a with a touch pad 2a comprises a base 10a, a cover 11a pivoted on an edge of the base 10a, and a plate 12a disposed on an upper surface of the base 10a. The touch pad 2a is arranged between the plate 12a and the base 10a and is partially revealed via a window hole formed in the plate 12a. The window hole in the plate 12a may be configured corresponding to the touch pad 2a for exposing at least a part of the touch pad 2a. The plate 12a has a pressing member 121a inwardly extending from an outline of the window hole to press and retain against the touch pad 2a. The touch pad 2a has a lower surface aligned with that of the plate 12a for connecting a circuit board 3a arranged thereunder. The touch pad 2a electrically connects the circuit board 3a, and the exposed part of the touch pad 2a can sense a user's finger effectively via the circuit board 3a to transfer and transmit signals therefrom. To avoid height differences between the plate 12a and the touch pad 2a, the pressing member 121a has a smoothing surface 122a formed on a free end thereof. The smoothing surface 122a comprises a graded curvature for smooth touching. However, the plate 12a with the window hole, the pressing member 121a, and the smoothing surface 122a are manufactured by many steps, thus increasing cost and reducing manufacturing efficiency. Furthermore, the pressing member 121a may be improperly long and reduce the size of the exposed part of the touch pad 2a. The pressing member 121a may be improperly thick to increase the height differences between the touch pad 2a and the plate 12a. The smoothing surface 122a of plate 12a is made within a small length of the pressing member 121a, and thus, complicated steps are required. Accordingly, designs of the pressing member 121a and the smoothing surface 122a are made carefully, and the manufacturing apparatus must be accurate and precise.

Traditionally, as shown in FIG. 1B, the laptop in the prior art may comprise two buttons 20a disposed near the exposed touch pad 2a. In addition, referring back to FIG. 1A, the plate 12a is opened up for exposing the touch pad 2a. Therefore, a periphery thereof adjacent to the pressing member 121a of the plate 12a is easily covered with and the exposed part of the touch pad 2a is easily stained with oil from a user's finger. Both are difficult to clean and, thus, affect the long-term life of the electronic product.

Hence, an improvement over the prior art is required to overcome the disadvantages thereof.

SUMMARY OF THE INVENTION

It is therefore an objective of the present invention to provide a hidden touch pad structure without any exposure of the touch pad.

It is another objective of the present invention to provide a hidden touch pad structure that is easier for manufacturing.

It is yet another objective of the present invention to provide a hidden touch pad structure that has lower cost for manufacturing.

The present invention provides a hidden touch pad structure adapted for an electronic product and which includes a touch pad and a plate covering the touch pad. The plate includes a pad-recognizing portion thereon corresponding to the touch pad. A circuit board electronically connecting to the touch pad receives a pressure signal when pressing the pad-recognizing portion of the plate.

In one embodiment of this invention, the pad-recognizing portion is formed by printing different colors on the plate. Alternatively, the pad-recognizing portion is comprised of a surrounding wall on the plate. The pad-recognizing portion can be formed with a concave surface of the plate. Alternatively, the pad-recognizing portion can be formed with a different surface on the plate, such as a coarse surface on the pad-recognizing portion.

In an embodiment, the plate covers at least a clicking button, and the clicking button electronically connects with the circuit board. The plate further comprises a click-recognizing portion for recognizing the clicking button. The click-recognizing portion is formed by printing different colors on the plate. Alternatively, the click-recognizing portion can be formed with a different surface on the plate.

In another embodiment, the plate exposes at least a clicking button, and the clicking button electronically connects with the circuit board.

The plate may have various thicknesses. Furthermore, the plate may comprise a recess concaved from a bottom surface thereof with a predetermined depth to form the various thicknesses thereof. The recess is formed on the plate integrally in one piece, and the touch pad is disposed in the recess of the plate. Preferably, the predetermined depth is substantially equal to a thickness of the touch pad. The touch pad may have a top surface retained against an inner surface and adjacent to the recess of the plate.

In one embodiment, the hidden touch pad structure may further comprise a lighting device around the touch pad and received inside the plate. When the circuit board receives the pressure signal, the circuit board further drives the lighting device to provide light, and the lighting device can be used for recognizing the touch pad. Preferably, the lighting device may be a plurality of LEDs (Light Emitting Diodes).

In one of the embodiments, the hidden touch pad structure may comprise a guiding member electronically connecting with the circuit board. The guiding member can be used for obtaining uniform light of the LEDs instead of dot light. Further, the guiding member may be a guide light strip.

The hidden touch pad structure can be applied in computers including a portable computer, a PDA, a mobile phone, or the like.

These and other features, aspects, and advantages of the present invention will become better understood with reference to the following description and appended claims. It is to be understood that both the foregoing general description and the following detailed description are by way of examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENTS

Figure 1:
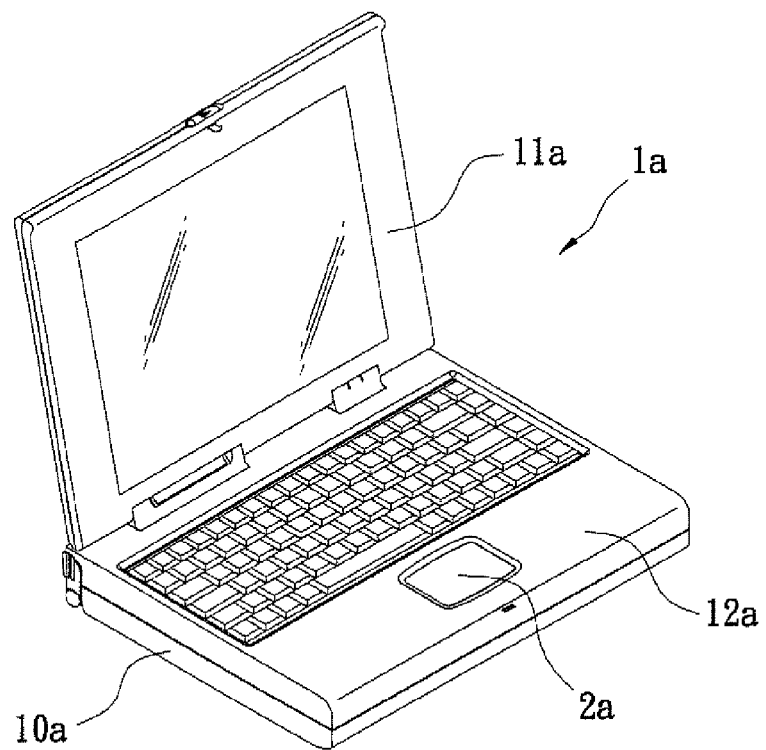
FIG. 1 is a perspective view of a conventional laptop with a touch pad.
Figure 1A:
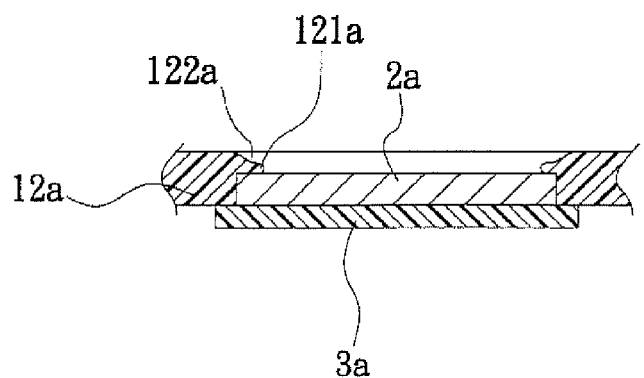
FIG. 1A is a cross-sectional profile of the touch pad adapted for the conventional laptop.
Figure 1B:
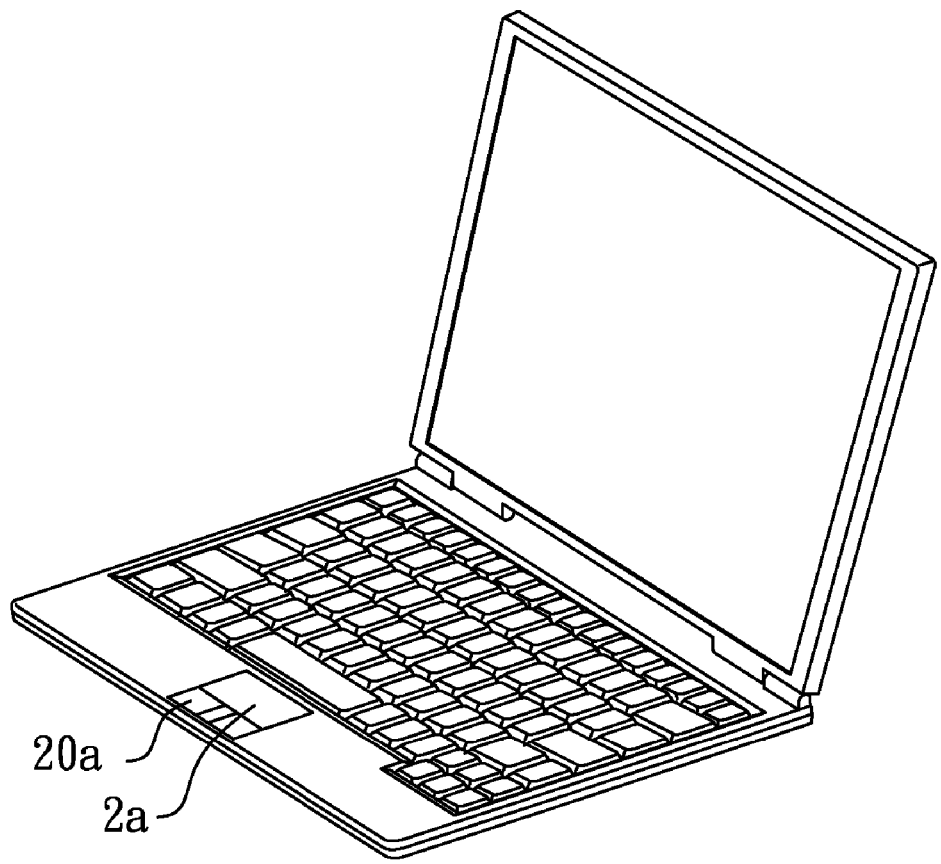
FIG. 1B is a perspective view of another conventional laptop with a touch pad and buttons.

Reference will now be made in detail to the present preferred embodiments of the invention, examples of which are illustrated in the accompanying drawings. Wherever possible, the same reference numbers are used in the drawings and the description and refer to the same or like parts.

Figure 2A:
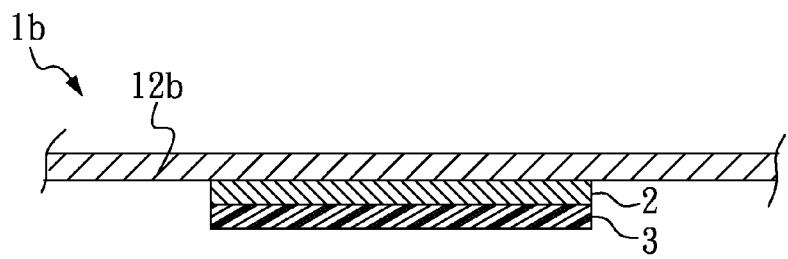
FIG. 2A is a partial cross-sectional profile of one embodiment of the hidden touch pad structure according to the present invention.
Figure 2B:
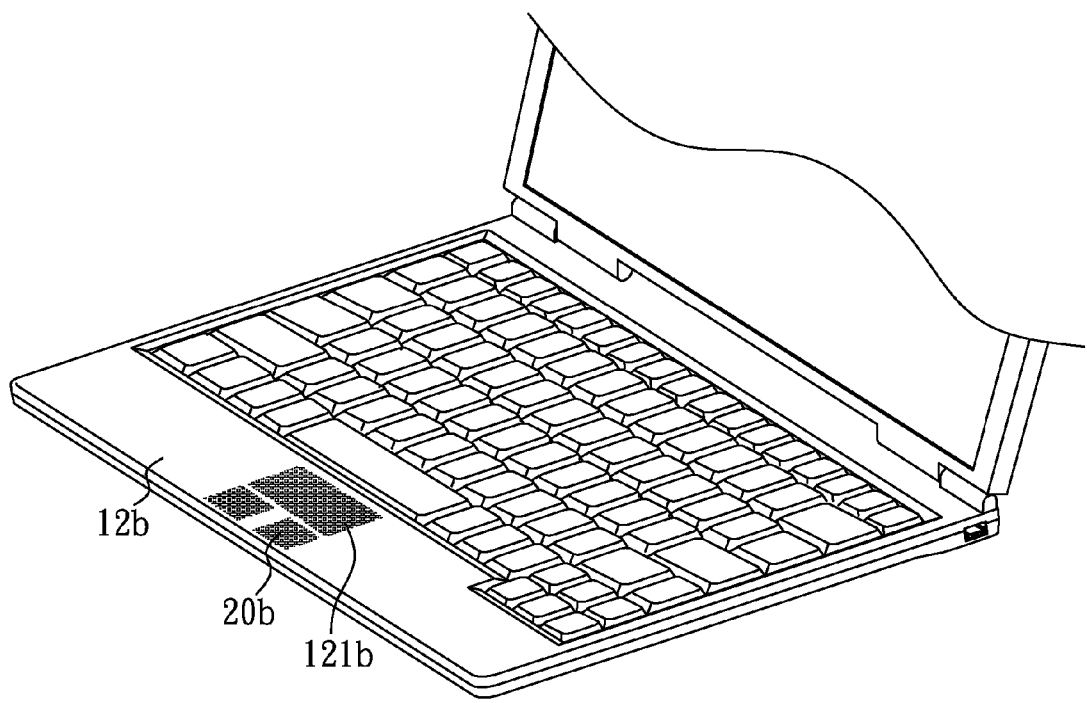
FIG. 2B is a partial perspective view in accordance with FIG. 2A.

According to the present invention, a hidden touch pad structure adapted for an electronic product, such as a portable computer, is provided. As shown in FIG. 2A, the hidden touch pad structure 1b comprises a plate 12b, a touch pad 2, and a circuit board 3 electronically connecting to the touch pad 2. Referring to FIG. 2B, the plate 12b comprises a pad-recognizing portion 121b thereon corresponding to the touch pad 2. When pressing the pad-recognizing portion 121b of the plate 12b, the circuit board 3 receives a pressure signal.

The pad-recognizing portion 121b can be formed by printing different colors on the plate 12b. Alternatively, the pad-recognizing portion 121b can be formed with a different surface on the plate 12b, such as a coarser surface on the pad-recognizing portion 121b.

In this embodiment, the plate 12b covers clicking buttons (not shown), and a clicking button electronically connects with the circuit board 3. Accordingly, the plate 12b further comprises a click-recognizing portion 20b for recognizing the clicking button. The click-recognizing portion 20b may also be formed by printing different colors on the plate 12b. Alternatively, the click-recognizing portion 20b can be formed with a different surface on the plate 12b. The color or the surface of the click-recognizing portion 20b can be the same or different from the color or surface of the pad-recognizing portion 121b. As those skilled persons in this art will understand, the positions of the clicking buttons are not limited to the positions as shown in FIG. 2B.

Figure 3:
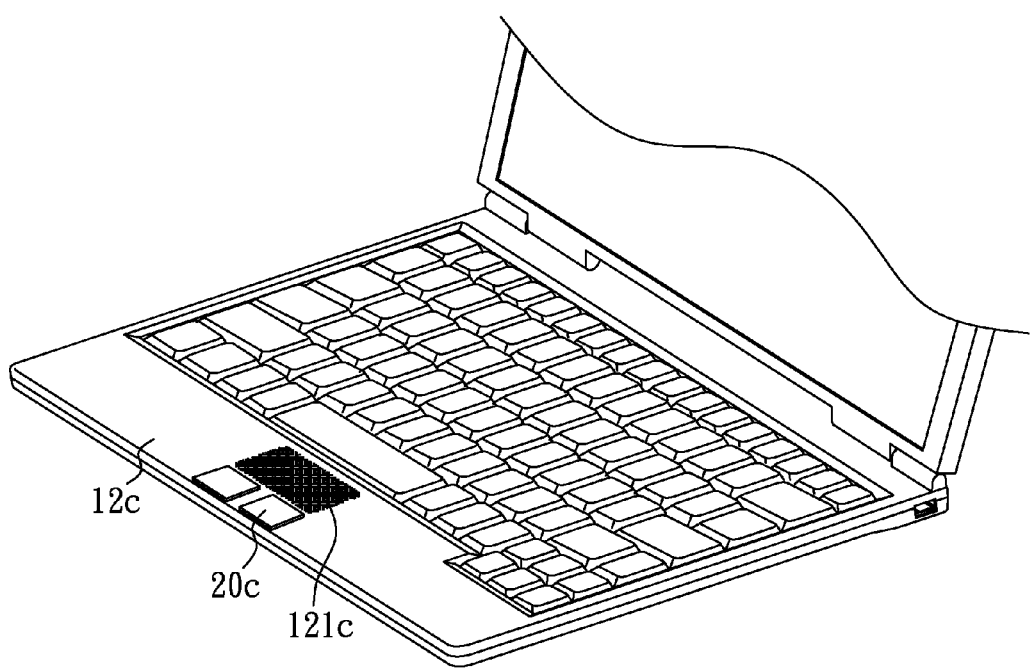
FIG. 3 is a partial perspective view of one embodiment of the present invention with a hidden touch pad structure and buttons exposed.

Referring to FIG. 3, in another embodiment, the plate 12c may expose at least a clicking button 20c, and the clicking button 20c is electronically connecting with the circuit board.

Figure 4A:
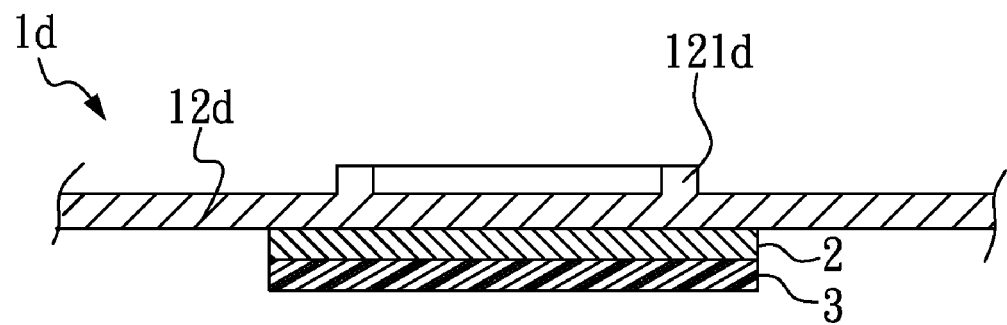
FIGS. 4A-4B, FIGS. 5A-5B, and FIG. 6A are partial cross-sectional profiles of different embodiment embodiments of the hidden touch pad structure according to the present invention.
Figure 4B:
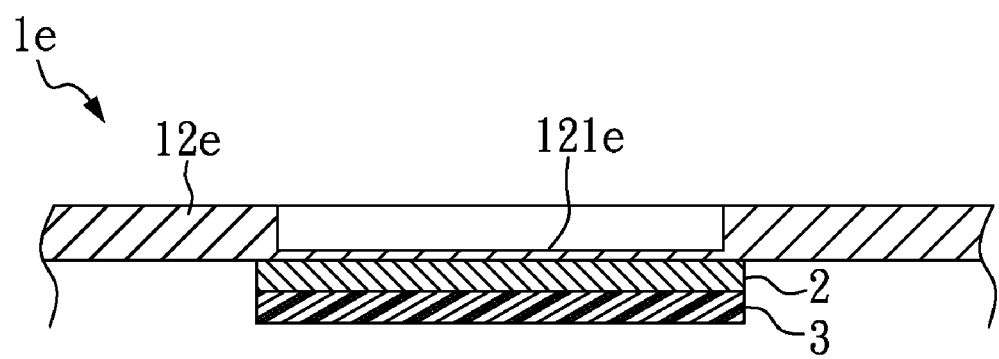

In addition, as shown in FIG. 4A, in another embodiment of the hidden touch pad structure 1d, the pad-recognizing portion can be formed with a surrounding wall 121d on the plate 12d. In another embodiment of the hidden touch pad structure 1e, as shown in FIG. 4B, the pad-recognizing portion can be formed with a concave surface 121e on the plate 12e.

Figure 5A:
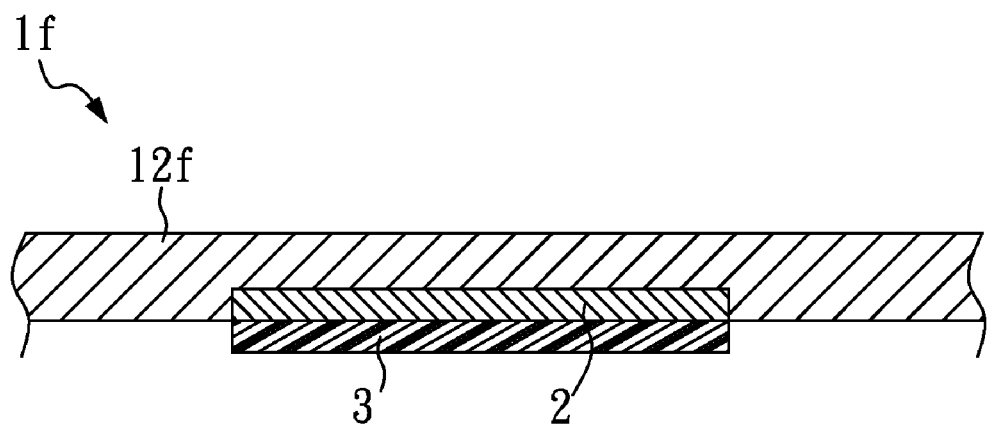

Though in FIG. 2A the plate 12b has an identical thickness, the plate 12b may have all various thicknesses. Referring to FIG. 5A, in another embodiment of the hidden touch pad structure 1f, the plate 12f may comprise a recess concaved from a bottom surface thereof with a predetermined depth to form the various thicknesses thereof. The recess is formed on the bottom of the plate 12f integrally in one piece, and the touch pad 2 is disposed in the recess of the plate 12f to omit other processes and high-precision apparatuses in the conventional process for simplifying manufacturing steps and reducing costs.

Preferably, the predetermined depth of the recess is substantially equal to a thickness of the touch pad 2. The touch pad 2 may have a top surface retained against an inner surface of the plate 12f, so that the touch pad 2 is adjacent to the recess of the plate 12f.

Figure 5B:
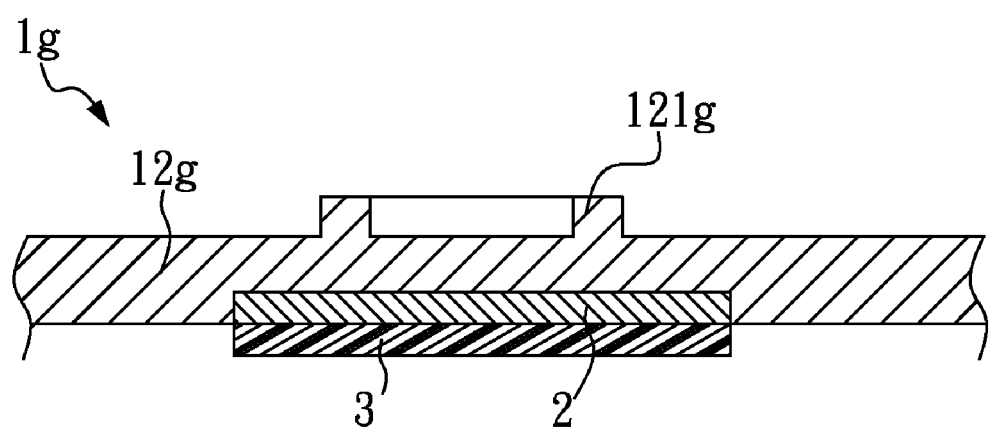

Referring to FIG. 5B, in another embodiment of the hidden touch pad structure 1g, the plate 12g may comprise a surrounding wall 121g for recognizing the touch pad 2 and a recess for receiving the touch pad 2. In addition, though there is no recess shown in the FIG. 4B, the plate 12e may also comprise a recess for receiving the touch pad. In addition, the depth of the recess may be deeper or thinner than the touch pad 2. In other words, the depth of the recess is not used to limit the present invention.

Figure 6A:
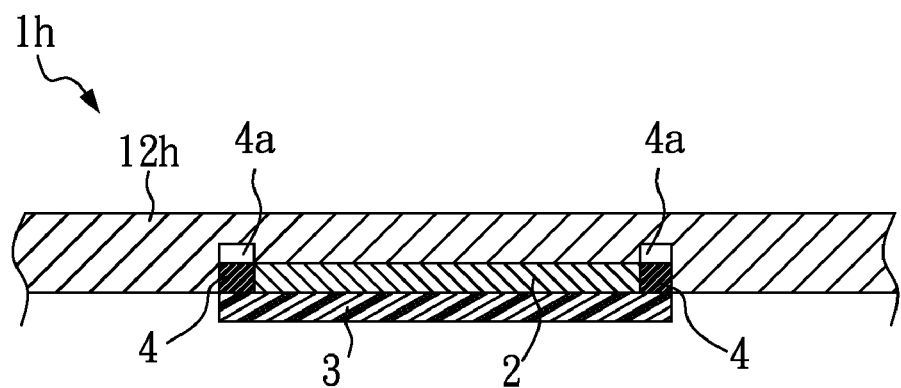

In another embodiment, referring to FIG. 6A, the hidden touch pad structure 1h may further comprise a lighting device 4 arranged around the touch pad 2 and received inside the plate 12h. Preferably, the lighting device 4 may be a plurality of LEDs (Light Emitting Diodes).

Figure 6B:
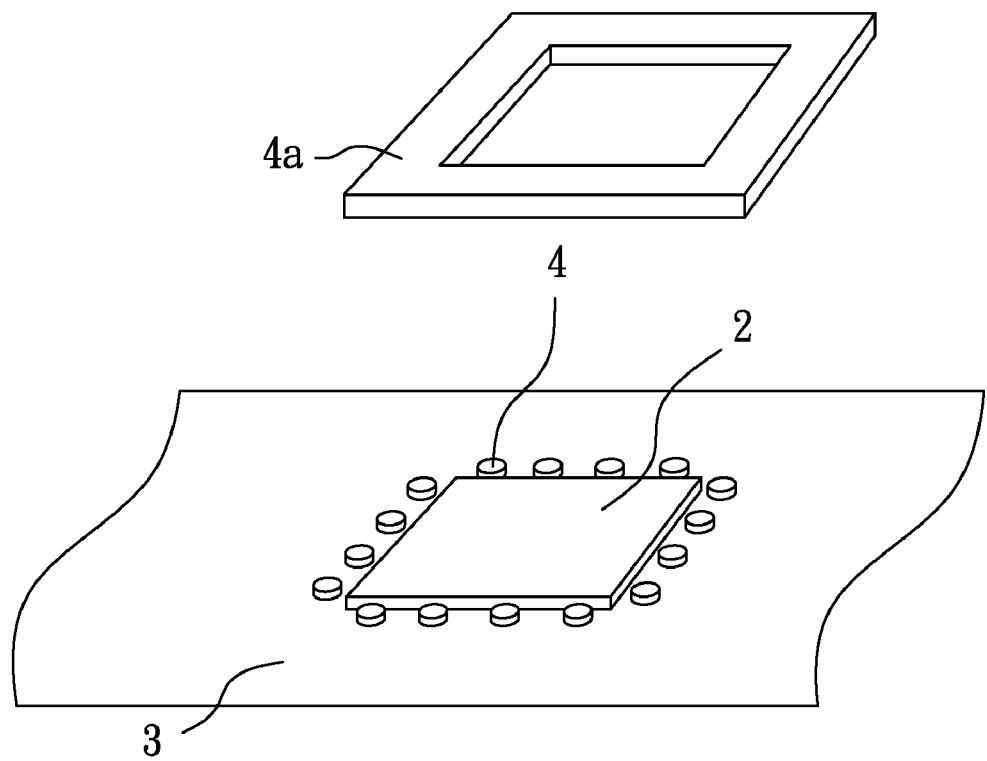
FIG. 6B illustrates a partial perspective view showing LEDs and a guiding member in accordance with FIG. 6A.

Referring to FIG. 6A and FIG. 6B, in one preferred embodiment, the hidden touch pad structure 1h may further comprise a guiding member 4a disposed between the plate 12h and the LEDs. In one preferred embodiment, the guiding member 4a electronically connects with the circuit board 3, which may be used for obtaining uniform light of the LEDs instead of dot light. It will be appreciated that neither the arrangement of the LEDs nor the shape of the guiding member 4a are used for limiting the present invention. For example, the guiding member 4a may be formed with one or more guide light strips (not shown) corresponding to the arrangement of the LEDs.

Figure 6C:
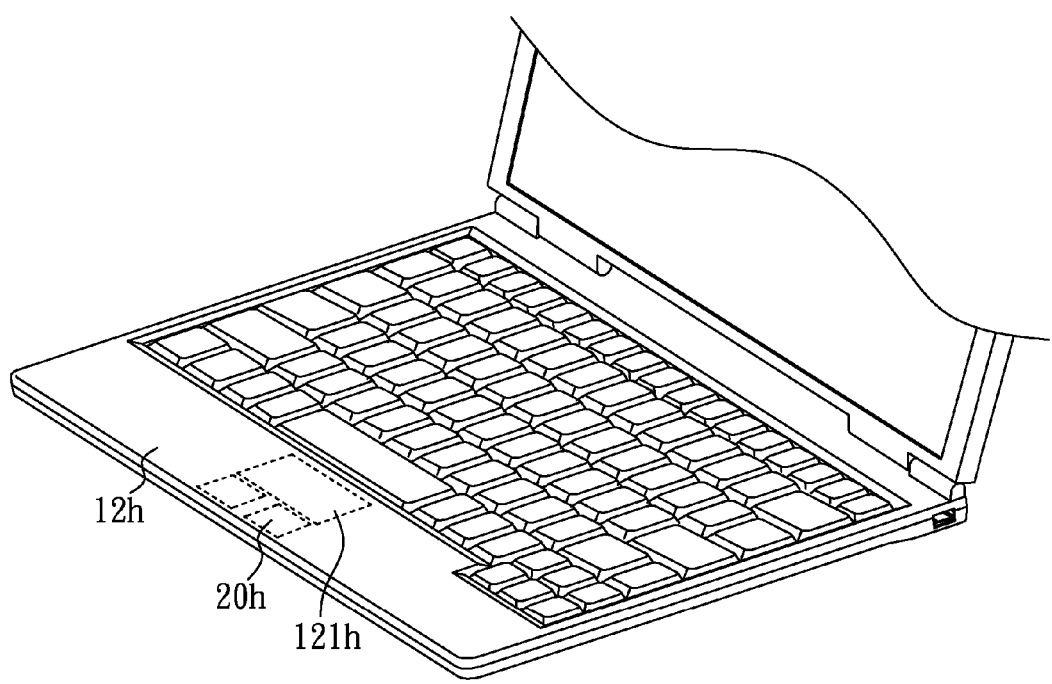
FIG. 6C is a partial perspective view of FIG. 6A with a hidden touch pad structure and buttons exposed.

As shown in FIG. 6A, when the circuit board 3 receives the pressure signal, the circuit board 3 further drives the lighting device 4 to provide light, and the lighting device 4 recognizes the touch pad 2. As shown in FIG. 6C, the plate 12b includes a pad recognizing portion 121b and a click recognizing portion 20b.

The hidden touch pad structures 1b-1h of the present invention can be applied in computers including a portable computer, a PDA, a mobile phone, or the like. Those of skill in this art will understand that the "touch pad" is well known and used for positioning the cursor on a computer screen. Therefore, the meaning of the "touch pad" in the specification may comprise or may not comprise the function of "mouse buttons". In other words, the subject matter of the present invention is to place the "touch pad" under the plate so that the "touch pad" is hidden under the plate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A hidden touch pad structure adapted for an electronic product, comprising:
   a touch pad;
   a plate having a periphery defining an area and a top surface, with the top surface being continuously flat within the area, with the plate covering the touch pad, with the plate comprising a pad-recognizing portion corresponding to the touch pad and smaller than the area; and
   a circuit board electronically connecting to the touch pad for receiving a pressure signal when the pad-recognizing portion of the plate is pressed, wherein the plate and the pad-recognizing portion are originally integrally formed in one piece, with the touch pad being under the pad-recognizing portion and the plate, wherein the pad-recognizing portion is formed by different printed colors on the plate.

2. The hidden touch pad structure of claim 1, wherein the plate exposes at least one clicking button, and with the clicking button electronically connecting with the circuit board.

3. The hidden touch pad structure of claim 1, wherein the plate covers at least one clicking button, and with the clicking button electronically connecting with the circuit board.

4. The hidden touch pad structure of claim 3, wherein the plate further comprises a click-recognizing portion recognizes the clicking button.

5. The hidden touch pad structure of claim 4, wherein the click-recognizing portion is formed by different printed colors on the plate.

6. The hidden touch pad structure of claim 4, wherein the click-recognizing portion is formed with a different surface on the plate.

7. The hidden touch pad structure of claim 1, wherein the plate has various thicknesses.

8. The hidden touch pad structure of claim 7, wherein the plate further comprises a recess concaved from a bottom surface with a predetermined depth to form the various thickness, the recess is formed on the plate integrally in one piece, the recess includes an inner surface spaced from the top surface and intermediate the top surface and the bottom surface, and the touch pad is disposed in the recess of the plate, with the bottom surface being opposite to the top surface.

9. The hidden touch pad structure of claim 8, wherein the predetermined depth is substantially equal to a thickness of the touch pad.

10. The hidden touch pad structure of claim 8, wherein the touch pad has a top surface retained against the inner surface of the recess and adjacent to the recess of the plate.

11. The hidden touch pad structure of claim 8 further comprising a lighting device around the touch pad and received inside the plate and disposed in the recess with the touch plate; wherein when the circuit board receives the pressure signal, the circuit board further drives the lighting device to provide light, and the touch pad is recognized by the lighting device.

12. The hidden touch pad structure of claim 11, wherein the lighting device comprises a plurality of LEDs (Light Emitting Diodes).

13. The hidden touch pad structure of claim 12, further comprising a guiding member disposed between the plate and the LEDs, and with the guiding member electronically connecting with the circuit board for obtaining uniform light of the LEDs.

14. The hidden touch pad structure of claim 13, wherein the guiding member is a guide light strip.

15. A portable computer comprises the hidden touch pad structure of claim 2.

16. The hidden touch pad structure of claim 1, wherein the plate and the pad-recognizing portion are originally integrally formed in one piece, with the touch pad being under the pad-recognizing portion and the plate.

17. A hidden touch pad structure adapted for an electronic product, comprising:
    a touch pad;
    a plate having a periphery and a top surface, with the plate covering the touch pad, with the plate comprising a pad-recognizing portion corresponding to the touch pad and smaller than the area; and
    a circuit board electronically connecting to the touch pad for receiving a pressure signal when the pad-recognizing portion of the plate is pressed, wherein the plate and the pad-recognizing portion are originally integrally formed in one piece, with the touch pad being under the pad-recognizing portion and the plate, wherein the pad-recognizing portion is formed by different printed colors on the plate with a surrounding wall defined in the top surface of the plate.

* * * * *